United States Patent [19]

Stone

[11] Patent Number: 4,499,713
[45] Date of Patent: Feb. 19, 1985

[54] NUT HARVESTER

[76] Inventor: Emory B. Stone, P.O. Box 121, Whigham, Ga. 31797

[21] Appl. No.: 514,602

[22] Filed: Jul. 18, 1983

Related U.S. Application Data

[63] Continuation-in-part of Ser. No. 384,595, Jun. 3, 1982, abandoned.

[51] Int. Cl.³ .............................................. A01D 51/00
[52] U.S. Cl. .................................. 56/328 R; 56/16.5; 15/345
[58] Field of Search ................. 56/327 R, 328 R, 332, 56/334, 336, 340, 16.5; 209/935; 15/327 C, 344, 345, 409, 421

[56] References Cited

U.S. PATENT DOCUMENTS

| | | | |
|---|---|---|---|
| 498,133 | 5/1893 | Mauermann | 15/300 R |
| 3,495,932 | 2/1970 | Tuma | 15/345 |
| 3,733,797 | 5/1973 | Kelley | 56/328 R |
| 3,808,785 | 5/1974 | Petcher | 56/328 R |
| 4,300,261 | 11/1981 | Woodward et al. | 15/345 |

FOREIGN PATENT DOCUMENTS

| | | | |
|---|---|---|---|
| 1421857 | 11/1965 | France | 56/328 R |
| 619697 | 4/1961 | Italy | 56/328 R |
| 115567 | 10/1978 | Japan | 15/345 |

Primary Examiner—Robert P. Swiatek
Assistant Examiner—David I. Tarnoff
Attorney, Agent, or Firm—B. P. Fishburne, Jr.

[57] ABSTRACT

Nuts on the ground are propelled by an air jet issuing from one tubular branch of a hand-held nut harvester into an opposing conveyor branch where the nuts are lifted until they strike a deflector in a separator chamber. Deflected nuts descend from the separator chamber to an attached collection receptacle. Debris entrained with nuts in the conveyor branch of the harvester is subjected to a venturi action produced by convex and concave spoon-like elements in the throat of the separator chamber immediately beyond the nut deflector and is swept through a rear downturned debris conduit or horn. The harvester can clear itself of debris through operation of an air stream diverter valve which diverts most of the harvesting air stream produced by a backpack blower on a reverse path through the conveyor branch of the harvester.

9 Claims, 6 Drawing Figures 4,499,713

NUT HARVESTER

CROSS-REFERENCE TO RELATED APPLICATION

This application is a continuation-in-part of prior copending application Ser. No. 06/384,595, filed June 3, 1982, for NUT HARVESTER, now abandoned.

BACKGROUND OF THE INVENTION

The objective of this invention is broadly the same as that stated in the above prior application, namely, to enable the efficient harvesting of downed nuts through the operation of a hand-carried lightweight harvesting device which employs a pneumatic air jet or stream to propel downed nuts into a conveyor tube of the harvester through which the nuts are delivered into a collection receptacle while entrained debris is swept through a rear extension of the conveyor tube.

The present invention seeks to improve on the construction and operation of the nut harvester in the prior application in two principal ways. First, a greatly improved nut and debris separating means is provided in the device, whereby the harvested nuts are forcefully deflected from the conveyor tube during their upward travel into a collection bag or receptacle. Entrained debris in the conveyor tube air stream is subjected to a venturi-like action caused by spoon-like devices in the throat of a separator chamber near the rear of the conveyor tube, resulting in almost total separation of debris and nuts in the harvester.

Secondly, the harvester is equipped with a hand-operated diverter valve whereby most of the forceful air stream descending through the harvesting or propelling tube can be diverted on a reverse path through the conveyor tube to clear the latter of debris. A small part of the forceful air stream continues through the harvesting tube and prevents the debris being cleared from the conveyor tube from entering the harvesting tube. The smaller opposing air stream also splits the larger stream causing the latter to cover a greater ground area when sweeping debris away from nuts on the ground.

Other features and advantages of the invention will become apparent during the course of the following description.

DETAILED DESCRIPTION

Figure 1:
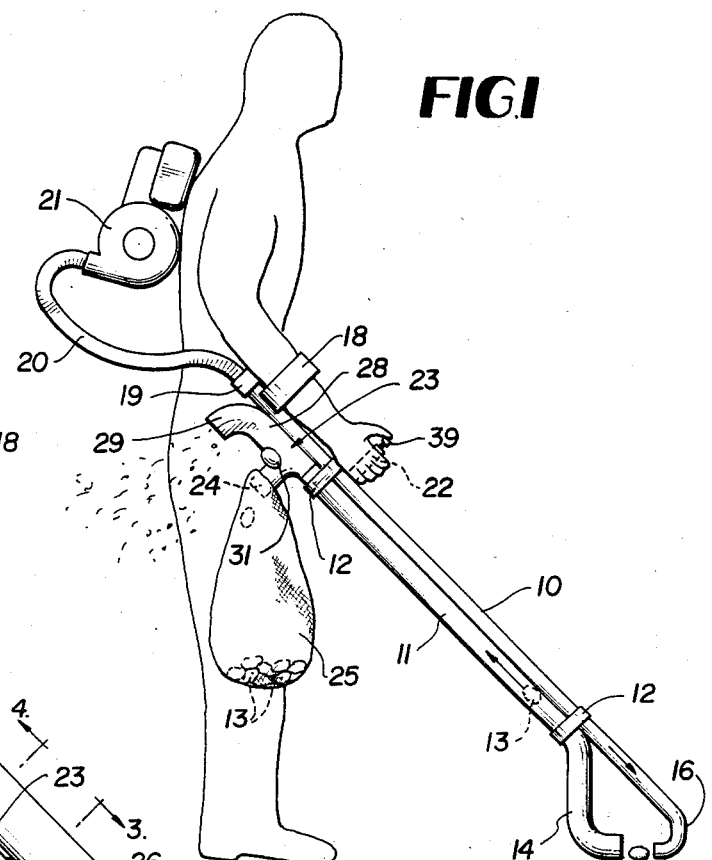
FIG. 1 is a side elevation of a nut harvester according to the invention and showing the same in use.

Referring to the drawings in detail wherein like numerals designate like parts, a hand-carried harvester for downed nuts comprises an air jet or nut propulsion tube 10 and an adjacent parallel harvested nut conveyor tube 11 joined at spaced points by strap clamps 12. The conveyor tube 11 is preferably of somewhat lager diameter than the air jet tube 10, and in any case sufficiently large to receive nuts 13 being harvested.

Forwardly of the lower clamp 12, the conveyor tube 11 has a vertical extension 14 carrying a short bottom horizontal inlet terminal 15. The air jet tube 10 at its lower end carries an elbow portion 16 having a short horizontal exit terminal 17 spaced from and coaxial with the terminal 15.

Near its rear end, the tube 10 is equipped with a forearm ring 18, and a rear coupling 19 of the tube 10 is connectable to an air supply hose 20 leading from a back-pack blower 21. Forwardly of the forearm ring 18, tube 10 carries an upstanding hand grip sleeve 22 also serving as the valve guide, as will be further described.

Conveyor tube 11 is somewhat shorter than the tube 10, and at its rear end is telescopically coupled with a harvested nut and debris separator unit 23 forming an important feature of the invention.

Near its forward end, the separator unit 23 has a right angle descending outlet sleeve 24 for harvested nuts, this sleeve being connectable to a harvested nut receiving bag 25 or other suitable receptacle.

Figure 2:
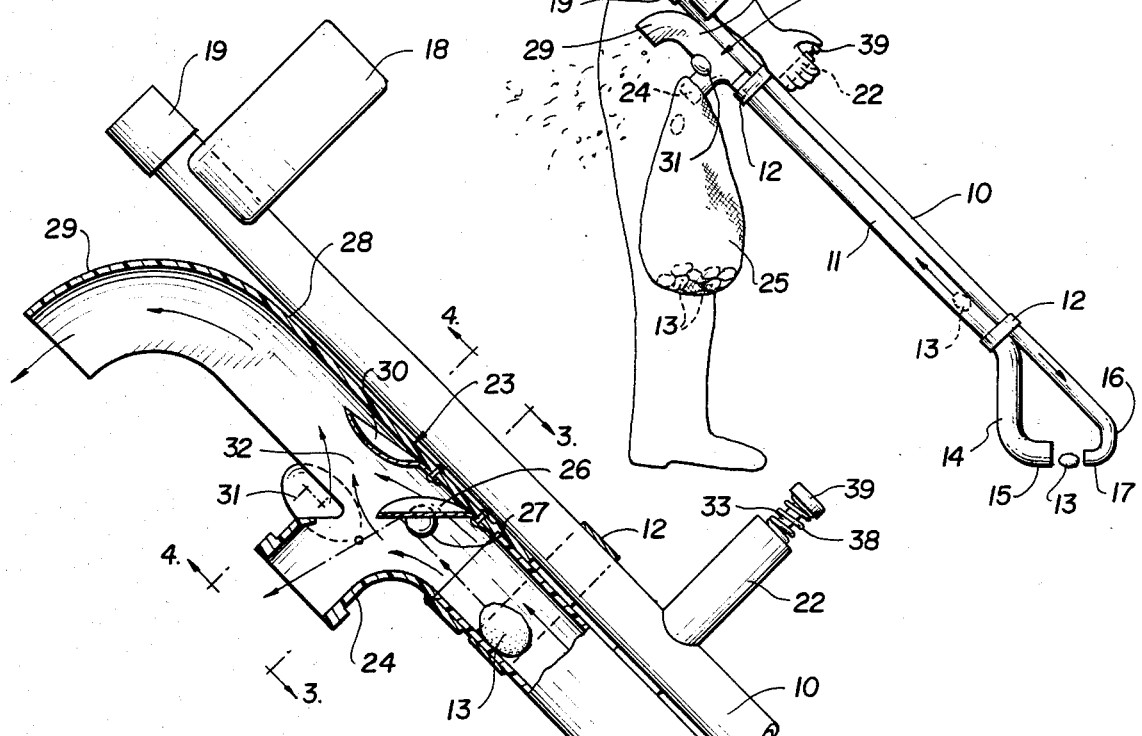
FIG. 2 is a fragmentary central vertical section through the nut harvester, partly in elevation, on an enlarged scale.
Figure 3:
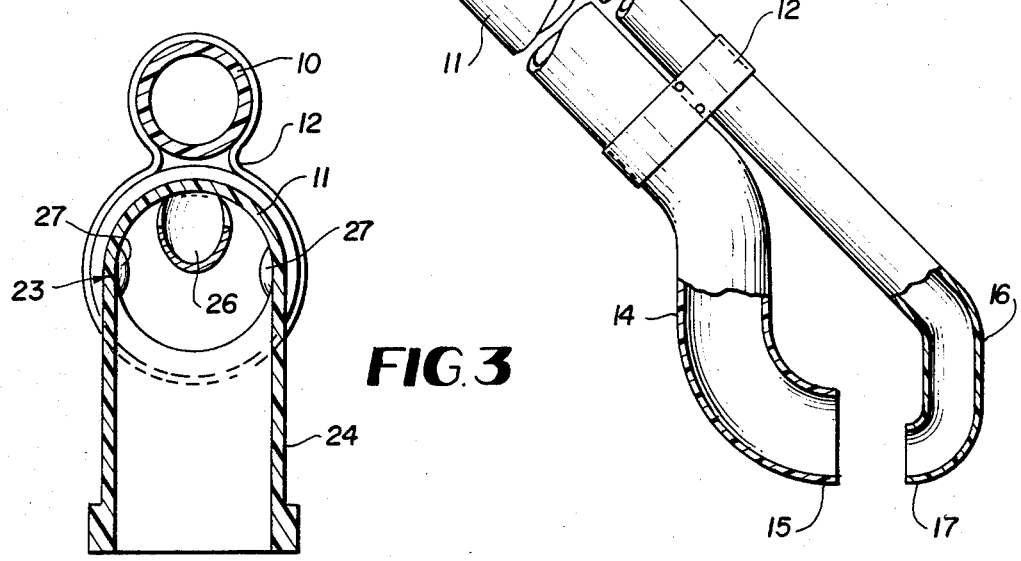
FIG. 3 is a transverse section taken on line 3—3 of FIG. 2.

Within the separator unit 23 above its outlet sleeve 24 and across the axis of tube 11 at an angle of about 45° is a spoon-like nut deflector 26 fixed to the upper wall of the separator unit. The concave side of the deflector 26 faces the path of movement of harvested nuts 13 upwardly through the conveyor tube and the deflector 26 extends across the greater portion of the bore of the tube 11 so that the nuts cannot avoid striking the deflector 26 and rebounding into the outlet sleeve 24 and into the collection sack 25, as shown by the arrow in FIG. 2. On opposite sides of the deflector 26, the tube 11 also contains a pair of opposing rounded protrusions 27 or guiding elements which tend to center the oncoming nuts 13 with respect to the deflector 26 and thus cooperate with the deflector in assuring that the nuts will be deflected through the right angular lateral sleeve 24.

Figure 4:
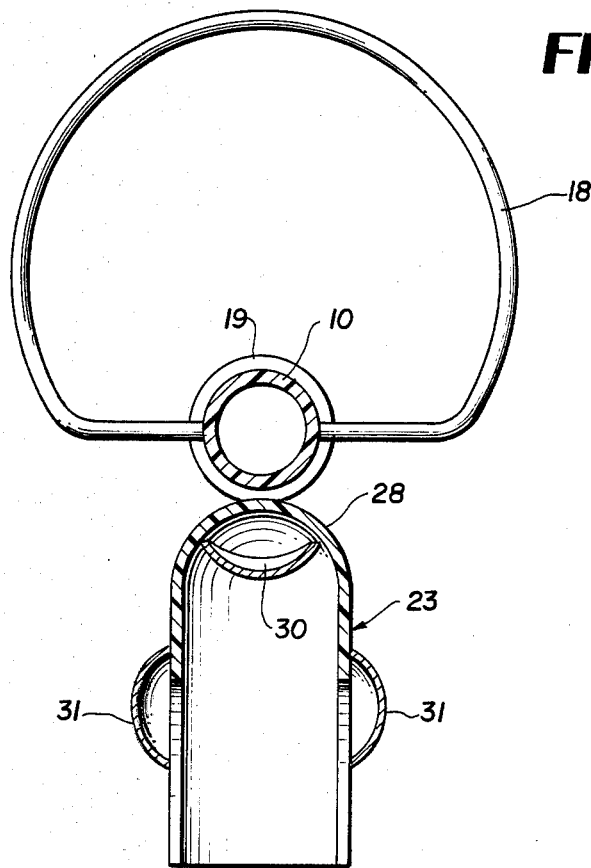
FIG. 4 is a similar section taken on line 4—4 of FIG. 2.

Rearwardly of the outlet sleeve 24 and deflector 26, the separator 23 further comprises a debris guiding and deflecting extension or horn 28 having a rear downturned elbow portion 29. The extension 28 is slotted along its bottom rearwardly of the outlet sleeve 24 and substantially inverted U-shaped and open along its bottom, as best shown in FIG. 4.

The separator unit further comprises an upper spoon-like element 30 attached to the top wall of the extension 28 near and rearwardly of deflector 26. The convex side of the element 30 is arranged lowermost and extends into the flow path through the extension 28 or horn. On the two opposite side walls of the extension 28 directly below the element 30 are two additional spoon-like elements 31 fixed to the side walls of the separator unit and having their concave sides facing inwardly in opposing relationship, as best shown in FIG. 4.

The three spoon-like elements 30 and 31 form a venturi-like passage or throat 32 in the separator unit 23 resulting in the formation of a small vacuum near the entrance to outlet sleeve 24. As a result, trash and debris entrained in the air stream flowing through the conveyor pipe 11 and separator unit 23 will not enter the sleeve 24 but will be propelled through the venturi-like throat 32 on a rearward path upwardly with increased velocity until the debris is deflected downwardly and out of the horn 28 by the rear elbow 29. The deflector 26, in addition to deflecting the nuts 13 through the outlet sleeve 24, aerodynamically diverts the air stream moving through the conveyor tube 11 around the deflector and through the throat 32 formed by the spoon elements 30 and 31. It may be seen that the separator unit 23 involves no moving parts. Its separating action is very efficient.

To allow periodic clearing of debris from the harvester tube 11, the hand grip 22 is used as a guide for the stem 33 of a diverter valve which includes a disc valve element 34 and a blocking valve element 35, both secured to and operated by the valve stem 33. Adjacent to the disc valve element 34, a communicating passageway 36 between tubes 10 and 11 is provided as well as a seating surface 37 for the disc valve element 34. The valve stem 33 is biased by a compression spring 38 to a position whereby the element 34 is normally seated and the passage 36 is closed. Also, the blocking element 35 is normally retracted inside of the hand grip sleeve 22. At its top end, the stem 33 has an operating head or button 39 which is easily engaged by the thumb of the worker utilizing the hand grip 22, as shown in FIG. 1.

Figure 5:
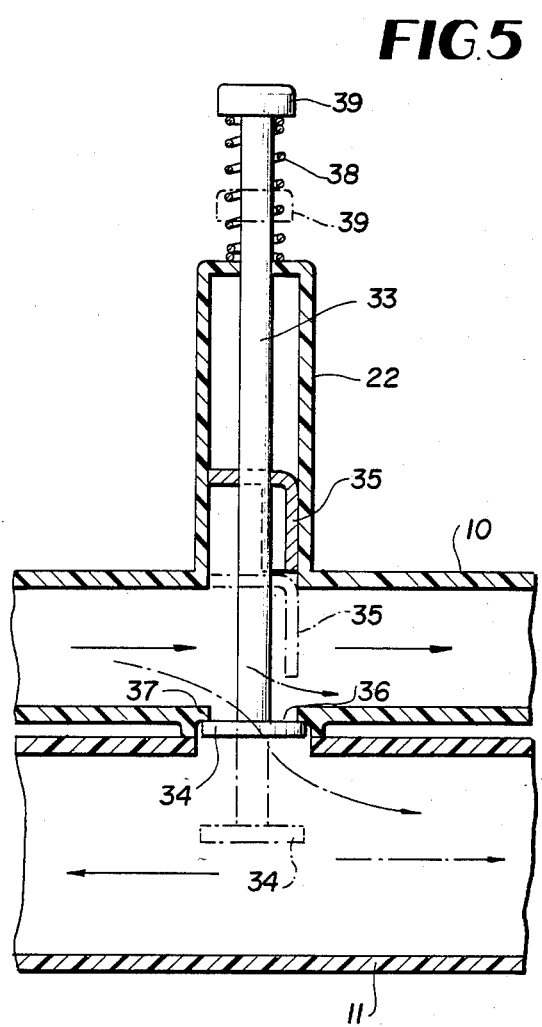
FIG. 5 is an enlarged fragmentary vertical section through an air stream diverter valve used to clear debric from the harvester.

As shown in FIG. 5, during the normal harvesting operation, a powerful air stream flows downwardly through the tube 10 and another air stream flows upwardly through the tube 11. Should debris partially block the tube 11, this debris can be cleared simply by depressing the valve stem 33 with the thumb to move the disc element 34 to a position within the tube 11 while the blocking element 35 moves across the bore of tube 10 and partially blocks this bore, while leaving a small passageway for air below the blocking element 35. Under these conditions, most of the air stream flowing through the tube 10 is diverted into the tube 11, as shown by the broken line arrows in FIG. 5, while a smaller part of the air stream passes around the blocking element 35 and continues to flow down through the tube 10.

Figure 6:
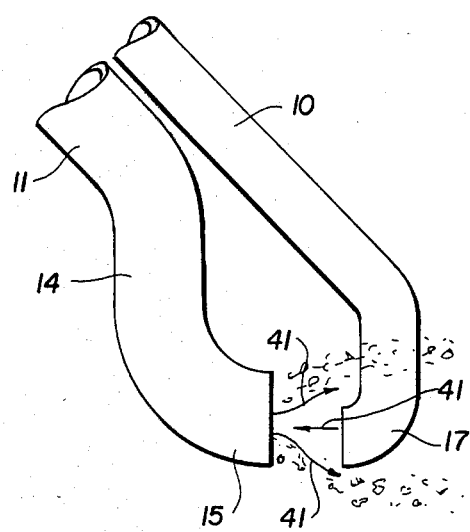
FIG. 6 is a fragmentary side elevation of lower opposing tube extensions of the harvester depicting the debris clearing operation under control of the diverter valve.

The result of this, shown in FIG. 6, is that debris is blown out of the bottom of tube 11 but is prevented from entering the bottom of tube 10 by the remaining air stream exiting from tube 10 indicated by the arrow 40 in FIG. 6. This smaller air stream 40 acts like a wedge on the larger air stream exiting the tube terminal 15 with debris and splits the larger air stream, as indicated by the arrows 41. This splitting is advantageous because it disperses the debris over a wider area of the ground and tends to sweep away debris on the ground clearing the way for further nut harvesting.

The harvesting device is lightweight and can be constructed from tubing formed of plastics. It enables the efficient rapid harvesting of large quantities of nuts with convenience. The device is entirely self-contained and portable. It is also rugged and durable.

The spoon-like element 30 can be omitted entirely if the nut harvester blower unit 21 is operated at sufficient speed at all times to produce a relatively high pressure and high velocity air stream. At lower speeds developing a relatively slower air stream with less pressure, the element 30 is necessary.

In the nut harvesting operation, there is not only a pushing or propelling jet action exerted on the downed nuts by the air stream issuing from the exit terminal 17 of tube 11. There is also a venturi effect developed between the terminals 17 and 15 whereby the nuts 13 on the ground are sucked toward and into the jetted air stream before being blasted into the inlet terminal 15 of tube 11. This mode of operation is important in the invention in that the operator has more freedom to hold the harvester at almost any angle to the ground, from points near his feet to as far out as he can reach. In other words, it is not critical or necessary that the terminals 17 and 15 be held parallel to the ground as ideally depicted in FIG. 1 because of the venturi action between the terminals 17 and 15. The user of the device does not have to concentrate continually on holding the harvester at a certain angle. It is only necessary to position the terminal 17 behind the nuts on the ground while the positioning of the inlet terminal 15 can be varied and is not critical because of the venturi effect between the two terminals 15 and 17.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A portable nut harvester adapted to be bodily carried by a user comprising an air stream delivery tube having a lower terminal adapted to direct an air stream substantially horizontally at ground level, a coating conveyor tube having a ground level entrance spaced from and substantially coaxial with said terminal of the air stream delivery tube, a separator unit on the rearward end of the conveyor tube including a lateral outlet sleeve adapted for connection with a harvested nut collection receptacle, a nut deflector near said outlet sleeve in the path of travel of harvested nuts through the conveyor tube and deflecting the nuts through the outlet sleeve, means on the separator unit forming a venturi-like throat near the mouth of the outlet sleeve and causing debris entrained within the air stream of the conveyor tube to be carried beyond the outlet sleeve and deflector to an exit point on the separator unit substantially rearwardly of said outlet sleeve, said means on the separator unit comprising a first spoon-like element attached to the top wall of the separator unit somewhat rearwardly of the deflector and having its convex side disposed lowermost, and a pair of opposite side spoon-like elements on the separator unit below the first spoon-like element and having laterally opposing concave faces, the three spoon-like elements forming within the separator unit a region of reduced pressure near the entrance to the lateral outlet sleeve whereby entrained debris is prevented from entering the outlet sleeve and is accelerated through a throat of the separator unit and expelled from the rear of the separator unit.

2. A portable nut harvester as defined in claim 1, and the separator unit having a forward sleeve portion telescopically engaged with the rear end of the conveyor tube and having a rearward debris deflecting and outlet portion extending substantially rearwardly of the throat of the separator unit defined by said three spoon-like elements.

3. A portable nut harvester adapted to be bodily carried by a user comprising an air stream delivery tube having a lower terminal adapted to direct an air stream substantially horizontally at ground level, a coacting conveyor tube having a ground level entrance spaced from and substantially coaxial with said terminal of the air stream delivery tube, a separator unit on the rearward end of the conveyor tube including a lateral outlet sleeve adapted for connection with a harvested nut collection receptacle, a nut deflector near said outlet sleeve in the path of travel of harvested nuts through the conveyor tube and deflecting the nuts through the outlet sleeve, means on the separator unit forming a venturi-like throat near the mouth of the outlet sleeve and causing debris entrained within the air stream of the conveyor tube to be carried beyond the outlet sleeve and deflector to an exit point on the separator unit substantially rearwardly of said outlet sleeve, and a manually operated diverter valve on the harvester forwardly of said separator unit and operable to divert a substantial part of the air stream flowing in the delivery tube laterally into the conveyor tube to clear debris lodged in the conveyor tube through its lower end.

4. A portable nut harvester as defined in claim 3, and said diverter valve comprising a lateral hand grip extension on the air stream delivery tube, a biased valve stem guidably engaged through the hand grip extension, a valve element on said stem adapted to open and close a connecting passage between the air stream delivery tube and conveyor tube, and an air stream blocking element on said stem adapted to enter the bore of the air stream delivery tube and partially block the air stream flowing therethrough when said stem is moved in a direction causing said valve element to open said connecting passage.

5. A portable nut harvester as defined in claim 4, and a spring connected with said stem biasing it relative to the hand grip extension in a direction causing the valve element to close the connecting passage, said blocking element then being retracted from the bore of the air stream delivery tube into a chamber of the hand grip extension.

6. A portable nut harvester adapted to be bodily carried by a user comprising side-by-side elongated air stream delivery and nut conveyor tubes each having spaced opposing coaxial terminals adapted to be held near ground level, a harvested nut and debris separator on the rear of the conveyor tube, and a manually operated air stream diverter valve on the harvester forwardly of said separator and being operable to divert at least a part of the air stream flowing through said delivery tube into said conveyor tube to clear the latter of debris lodged therein through the lower end of the conveyor tube.

7. A portable nut harvester as defined in claim 6, and a lateral hand grip on the harvester forwardly of said separator and serving as a guide for a stem of the air stream diverter valve.

8. A portable nut harvester as defined in claim 7, and the valve stem being biased to a diverter valve closed position and having an operating extension projecting exteriorly of said hand grip.

9. A portable nut harvester as defined in claim 8, and a forearm brace on the harvester rearwardly of said hand grip.

* * * * *